United States Patent
Dyson et al.

(10) Patent No.: US 6,691,849 B1
(45) Date of Patent: Feb. 17, 2004

(54) CLUTCH MECHANISM

(75) Inventors: James Dyson, Wiltshire (GB); Geoffrey Michael Burlington, Gloucestershire (GB)

(73) Assignee: Notetry Limited, Wiltshire (GB)

( * ) Notice: Subject to any disclaimer, the term of this patent is extended or adjusted under 35 U.S.C. 154(b) by 0 days.

(21) Appl. No.: 09/555,953

(22) PCT Filed: Dec. 8, 1998

(86) PCT No.: PCT/GB98/03654

§ 371 (c)(1),
(2), (4) Date: Oct. 2, 2000

(87) PCT Pub. No.: WO99/29223

PCT Pub. Date: Jun. 17, 1999

(30) Foreign Application Priority Data

Dec. 8, 1997 (GB) .............................. 9725943

(51) Int. Cl.⁷ .......................... A47L 5/30; F16D 43/206
(52) U.S. Cl. ...................... 192/55.1; 15/390; 192/56.6; 464/36
(58) Field of Search ............... 192/48.3, 55.1, 192/56.6, 56.62, 69.5, 89.21, 89.27, 96; 464/36; 15/390

(56) References Cited

U.S. PATENT DOCUMENTS

| | | | |
|---|---|---|---|
| 2,927,445 A | * 3/1960 | Amtsberg | 464/36 |
| 2,931,476 A | * 4/1960 | Zeidler et al. | 192/89.21 |
| 3,662,628 A | * 5/1972 | Schnepel | 464/36 |
| 4,235,321 A | * 11/1980 | Stein | 15/390 |
| 4,317,253 A | 3/1982 | Gut et al. | |
| 4,605,111 A | * 8/1986 | Ohno et al. | 192/56.62 |
| 4,610,047 A | 9/1986 | Dick et al. | |
| 4,766,641 A | 8/1988 | Daglow | |
| 5,505,676 A | * 4/1996 | Bookshar | 192/56.62 |
| 5,555,962 A | * 9/1996 | Hinterlechner | 192/56.62 |
| 5,893,443 A | * 4/1999 | Olmr | 192/89.27 |

FOREIGN PATENT DOCUMENTS

| | | |
|---|---|---|
| EP | 0 394 641 | 10/1990 |
| EP | 0 550 261 A2 | 7/1993 |
| EP | 0 643 235 | 3/1995 |
| EP | 0 747 611 | 12/1996 |
| GB | 1 199 512 | 7/1970 |
| GB | 2 106 200 | 4/1983 |
| GB | 2 146 238 | 4/1985 |
| JP | 61 096222 | 5/1986 |

\* cited by examiner

*Primary Examiner*—Rodney H. Bonck
(74) *Attorney, Agent, or Firm*—Morrison & Foerster LLP

(57) ABSTRACT

The invention provides a clutch mechanism (200) having a driven pulley (32) and a drive pulley (34) to which a load is applied, the clutch mechanism (200) having an engaged position in which torque applied in use to the driven pulley (32) is transmitted to the drive pulley (34), and a disengaged position in which torque applied in use to the driven pulley (32) is not transmitted to the drive pulley (34), wherein the clutch mechanism (200) also has override means (238, 242) by which at least a proportion of the torque applied to the driven pulley (32) is absorbed when the load applied to the drive pulley (34) exceeds a predetermined value. The override means comprising a pair of detent plates (238, 242), and at least one ball-bearing (248) being held captive between the detent plates (248, 242).

24 Claims, 4 Drawing Sheets

CLUTCH MECHANISM

FIELD OF THE INVENTION

The invention relates to a clutch mechanism. Particularly, but not exclusively, the invention relates to a clutch mechanism for use in conjunction with the brush bar of a vacuum cleaner and the drive therefor.

BACKGROUND OF THE INVENTION

Upright vacuum cleaners have downwardly directed dirty-air inlets arranged in the cleaner head through which dirty air is sucked into the vacuum cleaner. In the vast majority of cases, a brush bar is rotatably arranged in the mouth of the dirty air inlet so as to agitate the fibres of a carpet over which the vacuum cleaner is passed to release dirt and dust trapped in the carpet. The brush bar is normally rotated by the motor of the vacuum cleaner via a drive belt.

Upright vacuum cleaners are commonly convertible into cleaners which can be used as cylinder cleaners for above-floor cleaning. In this mode of operation, the main part of the cleaner, including the cleaner head, is often left stationery for a period of time with the motor running whilst dirty air is sucked into the vacuum cleaner via a hose or wand. If the brush bar is allowed to continue to brush against the carpet during this time, the carpet can become unnecessarily worn. Many cleaners incorporate devices for automatically lifting the cleaner head and brush bar away from the carpet when the cleaner is put into cylinder mode, but the rotation of the brush bar is not normally stopped since the lifting of the cleaner head prevents the unnecessary brushing of the carpet. A clutch mechanism has been proposed in which the drive belt used to drive the brush bar is shifted onto an idler pulley to disengage the drive when the cleaner is put into the cylinder mode of operation, but this type of mechanism is bulky, expensive to produce and unreliable.

Another difficulty with upright vacuum cleaners is that, on occasion, the brush bar will become jammed. When this happens, the motor can easily overheat and/or the drive belt can become damaged. Some machines are equipped with devices for automatically cutting out the motor when it overheats, but this is not always sufficient warn the user of the cause of the cut out and, when the motor has cooled, the cleaner is switched on again but the problem remains. Furthermore, there is always a risk, with machines of this type, that foreign objects such as children's fingers can be inserted into the dirty air inlet and serious injury can be caused by a rotating brush bar.

An object of the present invention is to provide a clutch mechanism, particularly a clutch mechanism suitable for use with a rotating brush bar of a vacuum cleaner, which is compact and reliable when used to disengage the drive of the brush bar. Another object is to provide a clutch mechanism which reduces the risk of overheating of the motor or mechanical failure in the event of the torque required to turn the brush bar exceeding a predetermined level. A further object is to provide a clutch mechanism which encourages the user of a vacuum cleaner to remove the cause of the problem when the brush bar becomes jammed.

SUMMARY OF THE INVENTION

The invention provides a clutch mechanism. The clutch mechanism includes override means, and is capable of allowing the brush bar to be driven in the engaged position, of disengaging the drive to the brush bar when above-floor cleaning is being carried out, and also of allowing the motor to continue running without overheating or destroying the drive belt (or belts) if the torque required to turn the brush bar exceeds a predetermined level. A vacuum cleaner in which the clutch mechanism is fitted is thereby safer to operate than known cleaners and is less prone to damage or faults which require maintenance or spare parts to be fitted. The cleaner is therefore cheaper to run and more user-friendly.

A preferred embodiment of the invention includes a feature in which belts remain carried by their respective pulleys in the same axial position means that the clutch mechanism can be put into the disengaged position without the need for bulky, unreliable means for transferring one or more belts to an idler pulley. Removing the need for axial movement of either pulley heads to less wear and tear on the components involved and also reduces the likelihood of malfunction.

A further preferred embodiment of the invention produces an override signal when override occurs draws the attention of the user of a vacuum cleaner in which the mechanism is fitted to the fact that the torque required to turn the brush bar exceeds a predetermined value and the need for the cause of the problem to be removed. The override signal is given at all times when the brush bar is jammed or retarded and is not triggered by the operating temperature of the motor. The user of the vacuum cleaner is therefore encouraged to remove the cause of the problem before recommencing cleaning, which is not always the case with cleaners in which the motor cuts out when its operating temperature exceeds a predetermined value when the brush bar is jammed. The invention discourages the user from continuing to use the machine under abnormal or strained conditions. A further advantage is that, when the override signal is audible, an audible warning is given immediately a foreign object such as a child's fingers is introduced into the dirty air inlet thereby minimizing any delay between an accident occurring and its discovery.

BRIEF DESCRIPTION OF THE DRAWINGS

An embodiment of the invention will now be described and fully explained with reference to the accompanying drawings, in which.

DETAILED DESCRIPTION OF THE INVENTION

Figure 1:
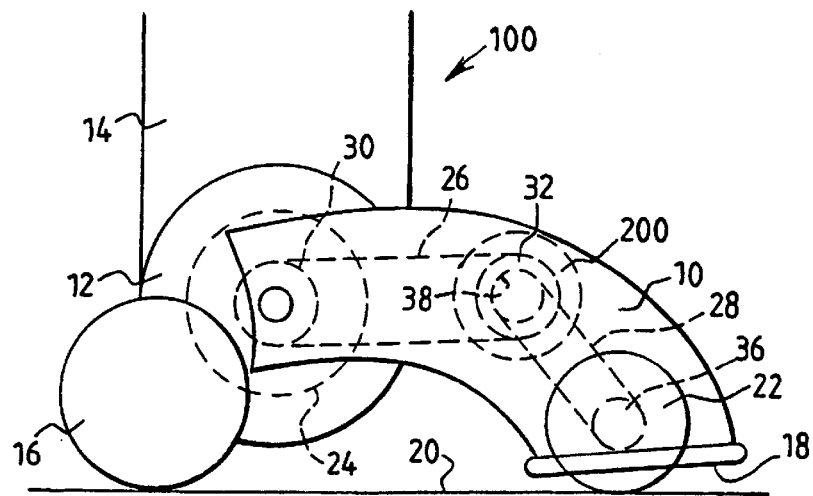
FIG. 1 is a schematic side view of the cleaner head of a vacuum cleaner illustrating the relative positions of a motor, a brush bar and a clutch mechanism according to the invention.
Figures 2, 2A:
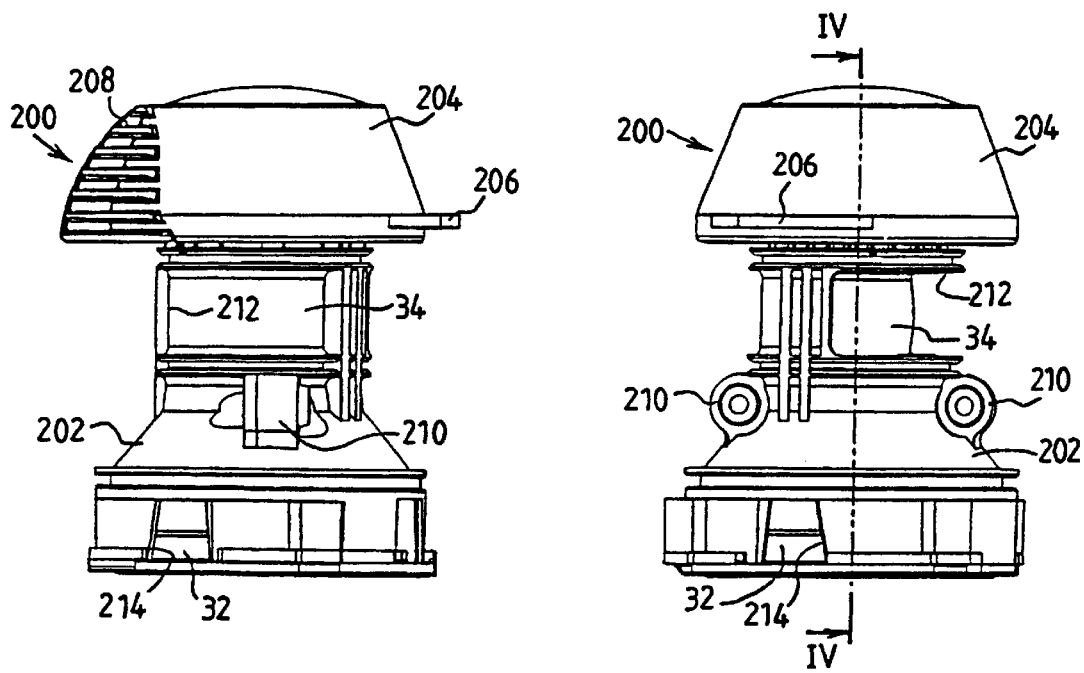
FIGS. 2 and 2A are side and front views of a clutch mechanism according to the invention omitting the drive belts for reasons of clarity.

FIG. 1 illustrates schematically the cleaner head 10 of a vacuum cleaner 100. The cleaner head 10 is rotatably mounted on a motor housing 12 located at the lower end of a main body 14 in which dust separating apparatus (not shown), in the form of a dust bag, cyclonic separator or other filter, is housed. A pair of wheels 16 are also mounted on the motor housing 12, from which the cleaner head 10 extends in a forward direction.

The cleaner head 10 has a dirty air inlet 18 located at its forward end and facing downwardly so that, in use, the dirty air inlet 18 rests on the surface 20 to be cleaned, usually a floor or carpet. A brush bar 22 is rotatably mounted in a known manner by means of bearings (not shown) so that the brush bar 22 extends across substantially the entire width of the dirty air inlet 18. The brush bar 22 protrudes slightly out of the dirty air inlet 18 so as to agitate the fibres of a carpet being cleaned and so enhance the cleaning process.

A motor 24 is housed within the motor housing 12. Normally, the motor 24 would be used to drive the brush bar 22, either directly or via a gearing mechanism. Prior art machines have been known to include clutch mechanisms having idler pulleys for receiving one of the drive belts and mechanisms for transferring the relevant belt to the idler pulley as described above, but these mechanisms are not reliable. In the embodiment shown, the clutch mechanism 200 according to the invention is located between the motor 24 and the brush bar 22 and drive belts 26,28 are arranged so as to transfer torque from the motor 24 to the clutch mechanism 200 and from the clutch mechanism 200 to the brush bar 22 respectively. The motor 24 can be any motor suitable for use in domestic vacuum cleaners. It must be able to receive a drive belt 26 and therefore carries a drive pulley 30 for receiving the drive belt 26. The drive belt could equally be carried directly on the motor shaft. The drive belt 26 is also carried by a driven pulley 32 forming part of the clutch mechanism 200 (to be described more fully later). The clutch mechanism 200 also has a drive pulley 34 which carries the drive belt 28, which is also carried by a pulley 36 on the brush bar 22. The drive belts 26,28 are preferably high strength, reinforced drive belts having an expected life of 10 years under normal operating conditions. They can be ridged or toothed belts, but are preferably flat. The relative diameters of the pulleys 30, 32, 34, 26 are designed to gear down the rotational speed of the motor (commonly 30–40 k rpm) to a suitable rotation speed for the brush bar 22. A suitable rotational speed for a brush bar is typically 3.5–5 k rpm. The brush bar 22 can be of any known design, preferably having a flared bristle arrangement at the edges thereof to facilitate edge-to-edge cleaning. The precise features and dimensions of the brush bar 22, the cleaner head 10 and the motor 24 are not significant to the present invention and will be described no further here.

The specific features of the clutch mechanism 200 will now be described in s detail with reference to FIGS. 2, 2A, 3 and 4. Looking firstly at FIGS. 2 and 2A, it can be seen that the clutch mechanism 200 is a self-contained unit having a main housing 202 and an actuator 204. The actuator 204 is connected to the main housing 202 so as to be rotatable with respect thereto, as will be described below. An actuator tag 206 extends outwardly from the actuator 204 at one circumferential location, and a manual actuator grip portion 208 extends outwardly from the actuator 204 at another circumferential location. The functions of these parts will be described fully below. The main housing 202 incorporates moulded projections 210 having through-holes for receiving screws or bolts by means of which the clutch mechanism 200 can be mounted onto a suitable part of the cleaner head of a vacuum cleaner, or in any other suitable y position for operation. The main housing 202 also incorporates openings 212, 214 positioned and dimensioned so as to allow the drive belts 26, 28 to pass through the main body 202 to the pulleys 32, 34.

Figure 3:
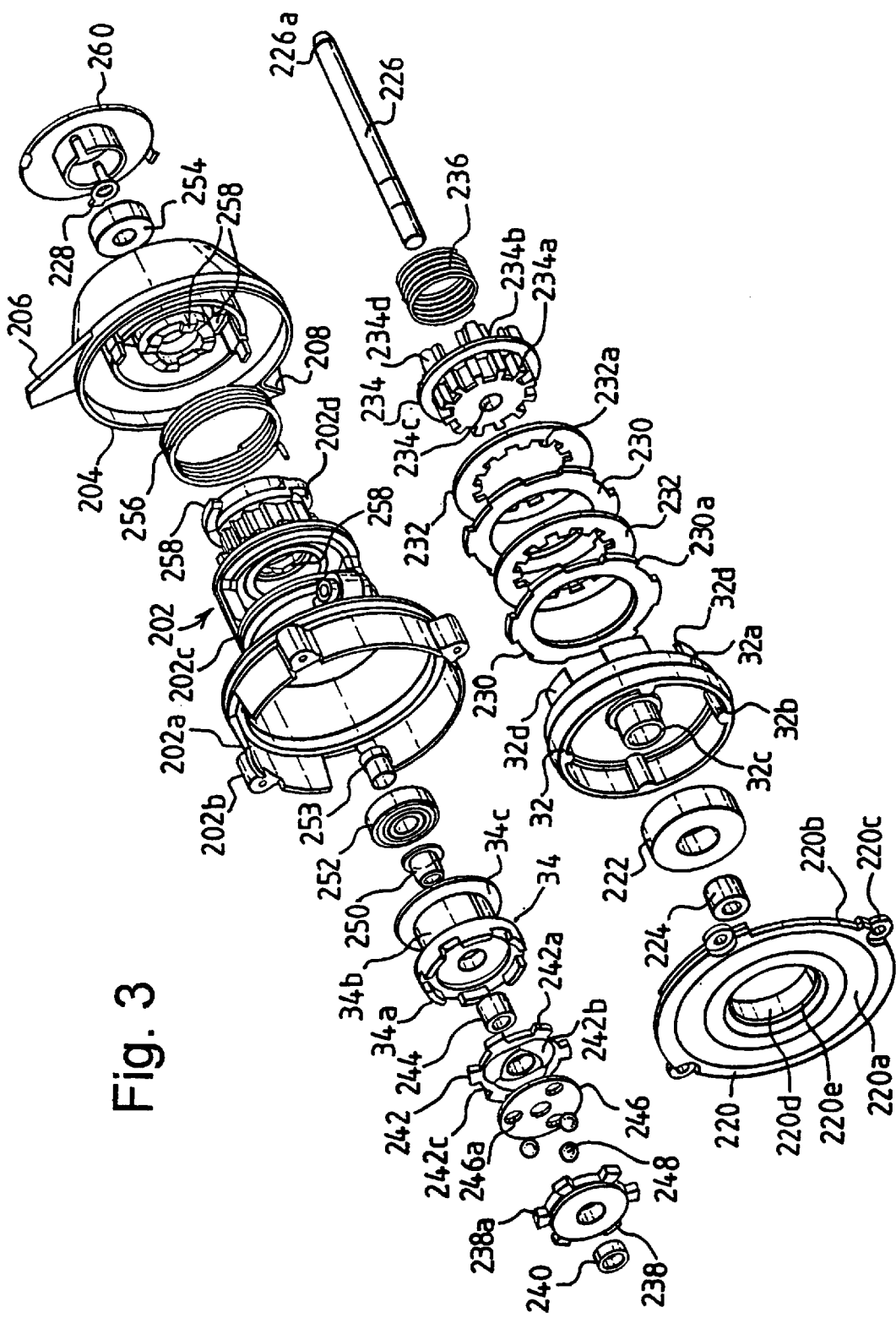
FIG. 3 is an exploded isometric view of the components of the mechanism of FIGS. 2 and 2A.

The components of the clutch mechanism 200 are shown in an exploded view in FIG. 3. The clutch mechanism 200 has a base cover 220 which is essentially formed as an annular plate 220a having an annular lip 220b around the outer circumference thereof. Three eyelets 220c are spaced around the circumference of the annular plate 220a and incorporate through-holes for receiving screws or bolts for securing the base cover 220 to the main housing 202. An upstanding cylindrical wall 220d is located around the inner circumference of the base cover 220 and the upstanding wall 220d has an inwardly extending lip 220e around its base. A first cylindrical bearing 222 is dimensioned to fit without play into the recess formed by the upstanding wall 220d and the inwardly projecting lip 220e acts as a stop to prevent unlimited axial movement of the first cylindrical bearing 222 through the said recess.

A second cylindrical bearing 224 in the form of a needle bearing receives a spindle 226 and runs freely thereon. The spindle 226 has an annular groove 226a for receiving a circlip 228 therein. The second cylindrical bearing 224 is dimensioned so as to fit inside the first cylindrical bearing 222 leaving a small annular gap between inner wall of the first cylindrical bearing 222 and the outer wall of the second cylindrical bearing 224.

The driven pulley 32 consists of a generally cylindrical outer pulley surface 32a adapted to receive the drive belt 26. Strengthening ribs 32b are spaced around the inner circumference of the cylindrical surface 32a. An axially extending circumferential wall 32c is dimensioned to fit without play into the annular gap defined between the first cylindrical bearing 222 and the second cylindrical bearing 224. The driven pulley 32 is thereby supported between the cylindrical bearings 222, 224.

The driven pulley 32 carries a plurality of axially extending lugs 32d which are generally rectangular in shape and extend axially away from the driven pulley 32 on the side remote from the base cover 220. In the embodiment illustrated, six equispaced lugs 32d are shown. A plurality of friction plates 230 and a corresponding number of clutch plates 232 are located within the circumference defined by the lugs 32d. In the embodiment shown, two friction plates 230 and two clutch plates 232 are shown, although more friction plates and clutch plates can be provided if desired. Provision of only a single friction plate and a single clutch plate is also possible. The clutch plates 232 are positioned between the friction plates 230 so that the friction plates 230 alternate with the clutch plates 232. Each friction plate 230 has a plurality of lugs 230a extending outwardly from the outer circumference thereof. The lugs 230a are dimensioned so as to project into the spaces between the lugs 32d of the driven pulley 32. In this way, when the driven pulley 32 is rotated, the friction plates 230 must rotate with the driven pulley 32. The interior circumference of each friction plate 230 is circular. Each clutch plate 232 has a circular outer circumference dimensioned to sit inside the lugs 32d but is provided with a plurality of inwardly projecting lugs 232a which project inwardly beyond the inner circumference of the friction plates 230. The thickness of the friction plates 230 and clutch plates 232 is such that, when all of the friction plates 230 and clutch plates 232 are placed against one another, the lugs 32d of the driven pulley 32 extend at least as far as the friction plate 230 which is furthermost from the driven pulley 32.

A support member 234 is generally dish-shaped in construction. The base of the support member 234, i.e. the side facing the base cover 220, is generally cylindrical and has a plurality of outwardly projecting lugs 234a which are arranged and dimensioned to project into the spaces between the lugs 232a around the inner circumference of each clutch plate 232. In this way, the support member 234 is rotatable with the clutch plates 232. A circumferential lip 234b projects outwardly from the support member 234 in order to allow an axial force to be applied to the clutch plate 232 furthermost from the base cover 220. A central aperture 234c extends through the support member to allow the spindle 226 to pass therethrough. The support member 234 is press-fitted on the spindle 226 so that the support member 234 rotates with the spindle 226. On the side of the support member 234 remote from the lugs 234a are further lugs 234d which extend parallel to the spindle 226 and away from the base cover 220. These further lugs 234d are shown as being fewer in number than the lugs 234a, although the relative sizes and spacings are immaterial.

A compression spring 236 is seated in the dish-shaped interior of the support member 234. The compression spring 236 bears against a first detent plate 238 which is mounted on the spindle 226 by means of a bearing 240. The first detent plate has outwardly projecting lugs 238a which are spaced and dimensioned to project into the spaces between the lugs 234d of the support member 234. Thus, the first detent plate 238 is rotatable with the support member 234. The first detent plate 238 is maintained at an axial distance relative to the support member 234 by the compression spring 236 such that, if sufficient force were to be applied to the first detent plate 238, the first detent plate 238 could move axially towards the support member 234.

A second detent plate 242 is mounted on the spindle 226 by means of a bearing 244. The second detent plate 242 also has outwardly projecting lugs 242a, but these do not project into the spaces between the lugs 234d of the support member 234. Between the first and second detent plates 238, 242 a bearing cage plate 246 is sandwiched. The bearing cage plate 246 is also mounted on the spindle 226 and is freely rotatable about the spindle 226. The bearing cage plate 246 has a plurality of through-holes 246a (three are shown in this embodiment) in which three ball-bearings 248 are held captive. Each detent plate 238, 242 has a plurality of inclined grooves 242b which are shaped such that, when the first and second detent plates 238, 242 rotate with respect to one another, the relative rotation of the ball-bearings 248 forces the detent plates 238, 242 apart thereby compressing the compression spring 236. The grooves 242b also include lips and recesses which also allow the detent plates 238, 242 to be pressed together under the action of the compression spring 236. The shaping of the grooves 242b ensures that the ball-bearings 248 are pressed into the recesses relatively quickly thereby causing an audible sound each time a ball-bearing 248 falls into a recess. The detent plates 238, 242 also carry small ramp-like projections 242c over which the bearing cage plate 246 rides when there is relative rotation between the detent plates 238, 242. This ensures that the bearing cage plate 246 remains in a position relative to the ball-bearings which discourages them from rolling out of the through-holes 246a, i.e. in a position substantially equidistant from the detent plates 238, 242.

The drive pulley 34 includes on its side facing the base cover 220 a plurality of lugs 34a which are designed to project into the spaces between the lugs 242a on the second detent plate 242. Therefore, the drive pulley 34 is rotatable with the second detent plate 242. The drive pulley 34 includes a cylindrical surface 34b for receiving the drive belt 28 leading to the brush bar 22. An outwardly extending lip 34c retains the drive belt 28 on the cylindrical surface 34b. The drive pulley 34 is mounted on the spindle 226 by means of a bearing 250.

A third cylindrical bearing 252 is arranged on the spindle 226 adjacent the drive pulley 34. The third cylindrical bearing 252 is mounted on the spindle 226 via a bush 253 so as to support the spindle 226 but also to allow axial movement between the third cylindrical bearing and the spindle 226. A fourth cylindrical bearing 254, which is mounted on the spindle 226 near the cirelip 228, also supports the spindle 226 although a small gap of approximately 1.5 mm is left between the circlip 228 and the face of the fourth cylindrical bearing 254 adjacent the circlip 228.

The main housing 202 is designed to cover and enclose the interior components of the clutch mechanism 200. The main housing 202 has a cylindrical portion 202a shaped and dimensioned so as to enclose the driven pulley 32. Three bosses 202b which incorporate through-holes are spaced around the cylindrical portion 202a and co-operate with the projections 220c on the base cover 220. Screws or bolts can thereby be used to secure the main housing 202 to the base cover 220. The main housing 202 also has a central portion 202c dimensioned and designed to enclose the friction and clutch plates 230, 232, the support member 234, the compression spring 236, the detent plates 238, 242, the bearing cage plate 246 and ball-bearings 248, and also the drive pulley 34. The arrangement of the components allows a good air seal to be maintained within the clutch mechanism, particularly in the area of the base of the drive pulley 34, which prevents dirt and dust entering vulnerable parts of the mechanism. The main housing 202 also has an end portion 202d which projects into the interior of the actuator 204. The end portion 202d is dimensioned so as to accept and house the third and fourth cylindrical bearings 252 and 254 and also the end of the spindle 226a remote from the base cover 220. The end portion 202d incorporates a shoulder 202e against which the fourth cylindrical bearing 254 abuts in order to prevent unlimited axial movement. The end portion 202d also incorporates an outwardly extending lip 202f which includes a recess for receiving one end of a torsion spring 256. The other end of the torsion spring 256 is retained by the actuator 204.

The main housing 202 and the actuator 204 also include cam surfaces 258. By means of these cam surfaces 258, the axial position of the actuator 204 with respect to the housing 202 is altered when the actuator 206 is rotated about the spindle 226. As has been previously mentioned, the actuator 204 includes an actuator tag 206 and also an actuator grip portion 208 so that the actuator 204 can be rotated with respect to the housing 202 either by hand or automatically by rotation of the vacuum cleaner cleaning head with respect to the main body and/or motor housing. Finally, an opening in the top of the actuator 204 is closed by means of a cap 260.

Figure 4:
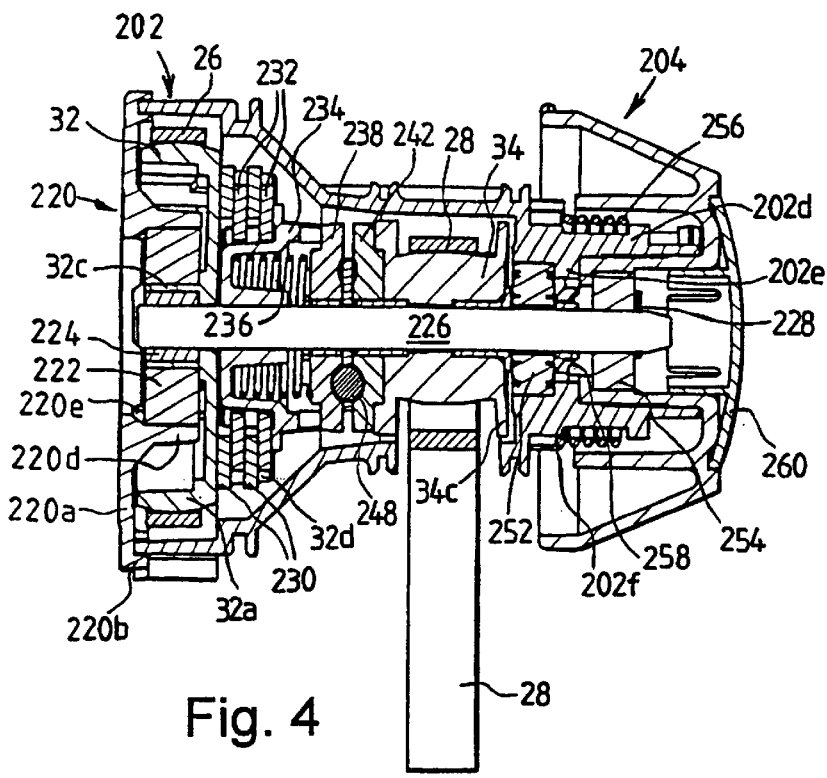
FIG. 4 is a cross-sectional view of the mechanism of FIGS. 2 and 2A shown in the normal driving or engaged position including the drive belts carried by the pulleys.

FIG. 4 shows the clutch mechanism 200 in its assembled form. It will be appreciated that the main housing 202 is fixedly connected to the base cover 220 by screws or bolts. The torsion spring 256 is acting so as to press the actuator 204 towards the housing 202. The spindle 226 is pressed to the left by means of the spring 236 and the clutch plates 232 are thus pressed firmly against the friction plates 230. This pressing contact means that any rotation of the friction plates 230 causes the clutch plates 232 to rotate. Furthermore, the ball-bearings 248 are also pressed by the compression spring 236 into the recesses 242b in the detent plates 238, 242 and therefore any rotation of the first detent plate 238 causes the second detent plate 242 to rotate.

Figure 5A:
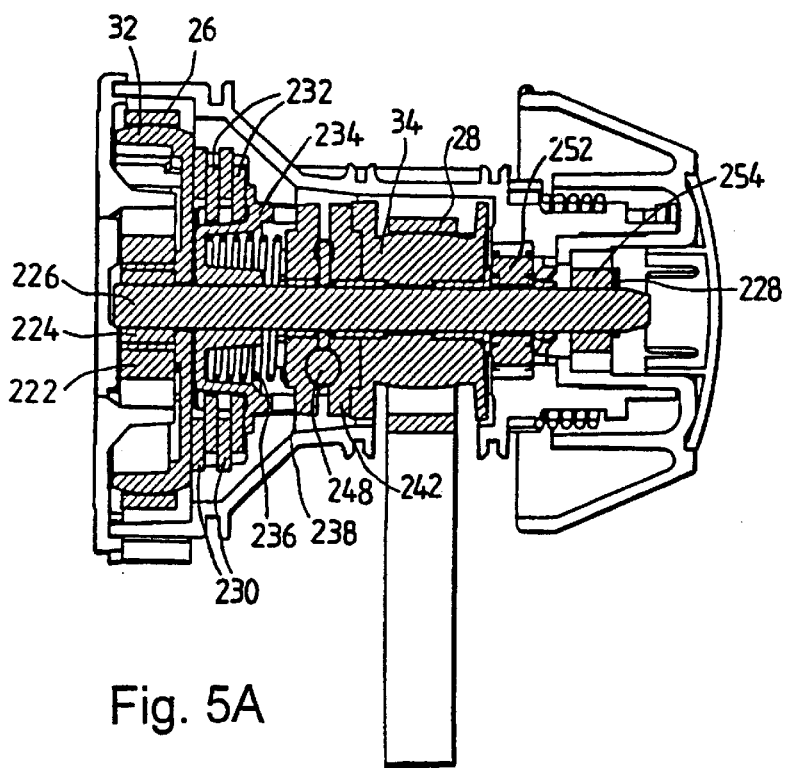
FIG. 5A is a cross-sectional view similar to FIG. 4 but illustrating the static and rotating parts of the mechanism, again in the engaged position.

This is then the normal driving position of the clutch mechanism 200. When the driven pulley 32 is rotated by the drive belt 26, the friction plates 230 are rotated and, because of the pressing force between the friction plates 230 and the clutch plates 232, the clutch plates 232 also rotate. This causes the support member 234 to rotate and therefore also the spindle 226 and the first detent plate 238. The pressing action of the compression spring 236 maintains the ball-bearing 248 within the recesses 242b in the second detent plate 242 which then also rotates. This causes rotation of the drive pulley 34 and the torque is transmitted via the belt 28 to the brush bar 22. FIG. 5A, in which the cross-hatched parts are the rotating parts, illustrates this normal driving position of the clutch mechanism 200.

When the vacuum cleaner 100 is to be used for above-floor cleaning, the handle of the vacuum cleaner will be brought into the upright position. The relative movement between the main body 14 and the cleaner head 10 can be used to actuate the actuator tag 206 automatically and cause the actuator 204 to rotate with respect to the main housing 202. The rotation of the actuator 204 with respect to the main housing 202 of the clutch mechanism 200 causes interaction of the cam surfaces 258. The cam surfaces 258 cause the actuator 204 to lift slightly with respect to the main housing 202. This brings the clutch mechanism 200 into the declutched position shown in FIG. 5B. As can be seen, the lifting of the actuator 204 causes the fourth cylindrical bearing 254 to lift the spindle 226 by abutting against the circlip 228. The entire spindle 226 is thereby lifted by a distance of not more than 1.5 mm. The spindle 226 slides in the bearing 253 on which the third cylindrical bearing 252 is mounted. It also slides in the bearing 250 carrying the drive pulley 34 and in the bearings 240,244 carrying the first and second detent plates 238,242 respectively. However, the support member 234 is lifted with the spindle 226 against the action of the spring 236 so that the pressing force acting between the friction plates 230 and the clutch plates 232 is released. The clutch plates 232 are therefore no longer pressed against the friction plates 230 and torque is thereby not transmitted therebetween.

Figure 5B:
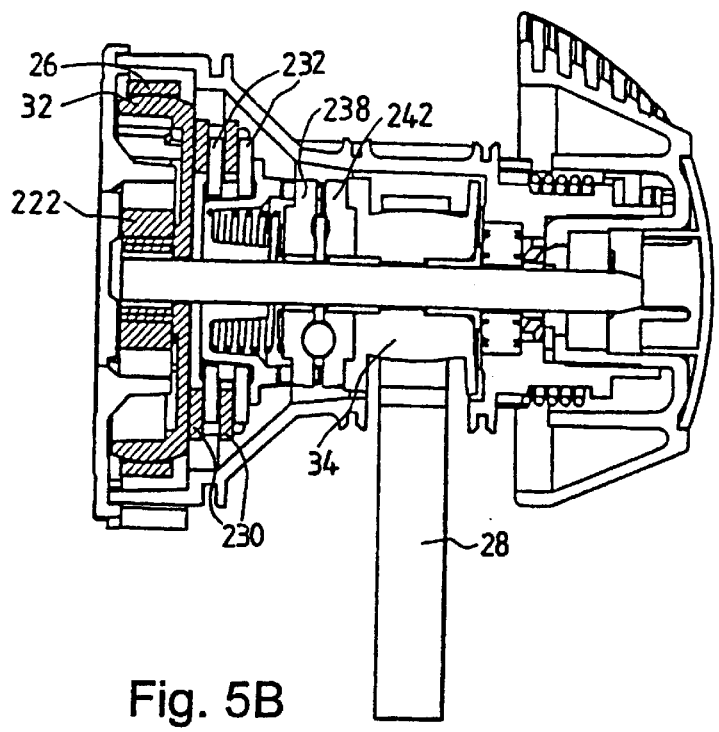
FIG. 5B is a cross-sectional view similar to FIG. 5A but showing the mechanism in the disengaged position.

In this position, the driven pulley 32 is still driven by the drive belt 26. Although the friction plates 230 are rotated with the driven pulley 32, the clutch plates 232 are not driven by the friction plates 230. The support member 234 therefore remains static, along with the spindle 226, the detent plates 238, 242 and the drive pulley 34. In this position, the torque transmitted to the driven pulley 32 by the drive belt 26 is not transmitted to the drive pulley 34 by the belt 28. FIG. 5B illustrates the disengaged position, again with the rotating parts shown cross-hatched.

The actuator grip portion 208 is provided so that the user of the vacuum cleaner 100 can put the clutch mechanism 200 into the declutched position at any time. This facility is useful in a number of situations, particularly when the vacuum cleaner is being used on an un-carpeted floor and the brush bar is not required.

Figure 5C:
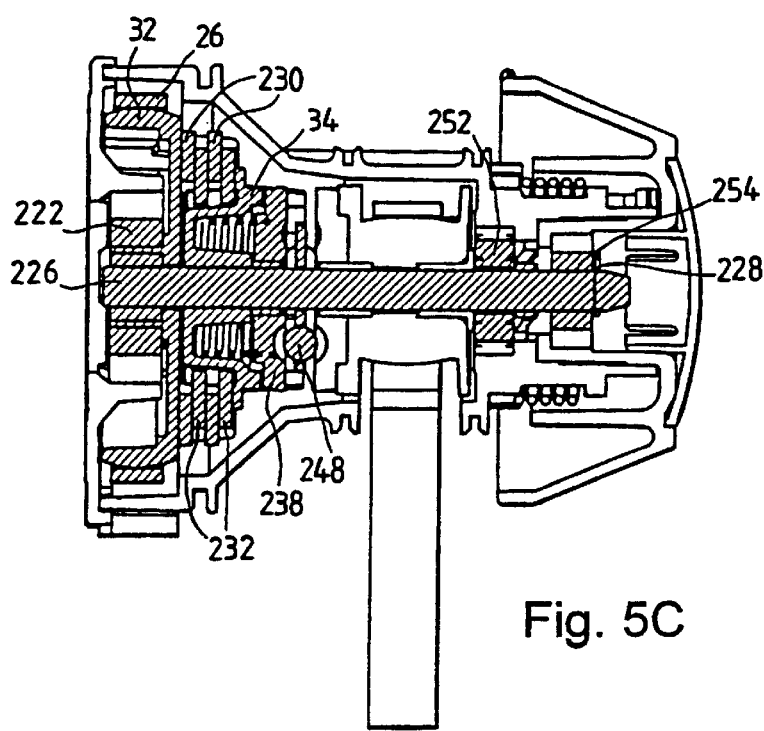
FIG. 5C is a cross-sectional view similar to FIG. 5A but showing the override means in operation.

The clutch mechanism 200 also has override means in the form of the first and second detent plates 238, 242. It sometimes happens that the brush bar 22 becomes jammed and therefore the torque required to turn the brush bar is drastically increased. There can also be an appreciable increase in the torque required to turn the brush bar if the vacuum cleaner is used on a carpet having a very long pile. When the torque is increased beyond a predetermined level, there can be a serious risk of the motor 24 overheating or one of the drive belts 26, 28 becoming worn. If the brush bar 22 becomes jammed or the torque required to turn it is too great, the drive pulley 34 should not be made to rotate. In this situation, there is forced relative rotation between the first and second detent plates 238, 242. The ball-bearings 248 ride around the grooves 242b in the detent plates 238, 242 whilst remaining held captive by the bearing cage plate 246 which is prevent from twisting with respect to the detent plates by means of the ramp-like projections 242c. This relative rotation is allowed by the enforced pressing of the first detent plate 238 against the action of the compression spring 236. The compression of the spring 236 also increases the force applied via the support member 234 to the friction plates 230 and the clutch plates 232 which reduces the risk of slip occurring therebetween immediately before or during override. The action of the compression spring 236 presses the ball-bearings 248 back into the recesses in the detent plates 238, 242 at every opportunity and the speed of the relative rotation is such that the ball bearings 248 produce a loud clattering noise during any override. This audible signal alerts the user of the vacuum cleaner 100 to the fact that the brush bar 22 is jammed and requires to be cleared before normal use of the vacuum cleaner 100 resumes, or to the fact that the brush bar is being retarded, perhaps by the length of pile of the carpet. The override operation of the clutch mechanism 200 is shown in FIG. 5C with the rotating parts shown cross-hatched.

The advantages of the clutch mechanism described above will be clear to a skilled reader. In particular, the mechanism is lightweight and compact with a construction which will not be prone to failure. The moving components are housed within a protective housing and, under normal operating conditions, there will be only minimal movement in the axial direction of only a few components since there is no need to transfer drive belts from one pulley to another as in the prior art. In the event of a failure, the clutch mechanism can be removed from the vacuum cleaner as a single unit and either serviced or replaced as desired.

The provision of an override signal, which is preferably audible and uncomfortably loud in the normal operating environment of a home, encourages the user to ensure that the cause of the override is removed before continuing to use the vacuum cleaner, very often merely by removing material which has become wrapped around the brush bar causing it to jam. This results in the vacuum cleaner being operated under proper working conditions for a higher percentage of the time and extends the life of the cleaner. It also results in better customer satisfaction and lower running costs due to less maintenance and fewer spare parts being required.

Purely for illustrative purposes, a clutch mechanism as described above can be fitted in the cleaner head of a vacuum cleaner having a 600W motor. The power required to turn the brush bar under normal operating conditions would be around 15W, or perhaps less. If the brush bar became jammed or retarded so that the power required to apply sufficient torque to turn it increased to around 45W, the override mechanism would operate causing the ball bearings to run around the recesses and give an audible signal to the user. The power required to drive the override means is only 15W and therefore the mechanism will only resume driving the brush bar when the power required to do so is less than 15W. The characteristics of the mechanism can be adjusted by altering the characteristics of various components, notably the compression spring.

What is claimed is:

1. A clutch mechanism comprising a driven pulley and a drive pulley to which a load is applied, the clutch mechanism having an engaged position in which torque is applied to the driven pulley and transmitted to the drive pulley and a disengaged position in which torque is not transmitted to the drive pulley, the clutch mechanism further comprising override means by which at least a proportion of the torque applied to the driven pulley is absorbed when a load applied to the drive pulley exceeds a predetermined value, the override means being separate and axially displaced from the drive pulley and the driven pulley.

2. A clutch mechanism according to claim 1, wherein the override means is effective when the clutch mechanism is in the engaged position.

3. A clutch mechanism according to claim 1, wherein the drive pulley is connected to a brush bar of a vacuum cleaner.

4. A clutch mechanism according to claim 1, wherein each pulley carries a belt and each belt remains carried in both the engaged position and the disengaged position.

5. A clutch mechanism according to claim 1, wherein the override means is adapted to provide an override signal when override occurs.

6. A clutch mechanism according to claim 1, wherein the override means comprises a pair of detent plates, the detent plates being pressed together so as to transmit torque therebetween in the engaged position, and the detent plates being rotatable with respect to one another when override occurs.

7. A clutch mechanism according to claim 6, wherein the detent plates are pressed together by means of a compression spring.

8. A clutch mechanism according to claim 6, wherein at least one ball-bearing is held captive between the detent plates and the detent plates having at least one groove to retain at least one ball-bearing.

9. A clutch mechanism according to claims 8, wherein the at least one the groove includes a recess into which a rolling ball is pressed so as to make an audible sound when override occurs.

10. A clutch mechanism according to claim 8, wherein the ball-bearings are held captive by means of a bearing cage plate positioned between the detent plates.

11. A clutch mechanism according to claim 10, wherein the detent plates include ramp-like projections to maintain the bearing cage plate substantially equidistant from each detent plate during override.

12. A clutch mechanism according to claim 1, wherein the mechanism comprises at least one friction plate and at least one clutch plate, the friction and clutch plates being pressed together so as to transmit torque therebetween in the engaged position, and the friction and clutch plates being rotatable independently in the disengaged position.

13. A clutch mechanism according to claim 12, wherein the friction and clutch plates are pressed together so as to transmit torque therebetween in the override position.

14. A clutch mechanism according to claim 12, wherein the drive pulley, the driven pulley and the friction and clutch plates are all mounted on a spindle and axial movement of the spindle causing the friction and clutch plates to be either pressed together or released, according to the position of the clutch mechanism.

15. A clutch mechanism according to claim 14, wherein the clutch plates and the friction plates are pressed together under the action of a compression spring in the engaged and override positions.

16. A clutch mechanism according to claim 14, wherein the mechanism comprises a housing and an actuator which is rotatable with respect to the housing.

17. A clutch mechanism according to claim 16, wherein rotation of the actor with respect to the housing causes axial movement of the spindle.

18. A clutch mechanism according to claim 16, wherein cam surfaces are provided between the actuator and the housing so that rotation of the actuator with respect to the housing causes a variation in the axial position of the actuator with respect to the housing.

19. A vacuum cleaner incorporating a clutch mechanism according to claim 1.

20. A clutch mechanism comprising a driven pulley and a drive pulley to which a load is applied, the clutch mechanism having an engaged position in which torque is applied to the driven pulley and transmitted to the drive pulley, and override means by which at least a proportion of the torque applied to the driven pulley is absorbed when a load exceeds a predetermined value, the override means being separate and axially displaced from the drive pulley and the driven pulley and comprising a pair of detent plates, the detent plates being pressed together so as to transmit torque therebetween in the engaged position, and the detent plates being rotatable with respect to one another when override occurs, and at least one ball-bearing being held captive between the detent plates, the detent plates retaining the at least one ball-bearing within a groove in each detent plate, wherein each groove is continuous about an axis of rotation of the detent plates.

21. A clutch mechanism according to claim 20, wherein at least one of the grooves includes recesses into which the ball-bearings are pressed so as to make an audible sound when override occurs.

22. A clutch mechanism according to claim 20, wherein the ball-bearings are held captive by means of a bearing cage plate positioned between the detent plates.

23. A clutch mechanism according to claim 22, wherein the detent plates include ramp-like projections to maintain the bearing cage plate substantially equidistant from each detent plate during override.

24. A clutch mechanism according to claim 20, wherein the clutch mechanism also has a disengaged position in which torque is applied to the driven pulley and is not transmitted to the drive pulley.

* * * * *

UNITED STATES PATENT AND TRADEMARK OFFICE
CERTIFICATE OF CORRECTION

PATENT NO. : 6,691,849 B1
DATED : February 17, 2004
INVENTOR(S) : James Dyson et al.

It is certified that error appears in the above-identified patent and that said Letters Patent is hereby corrected as shown below:

<u>Column 10,</u>
Line 11, please replace "actor" with -- actuator --

Signed and Sealed this

Second Day of August, 2005

JON W. DUDAS
*Director of the United States Patent and Trademark Office*